United States Patent
Sedky et al.

(10) Patent No.: US 9,128,653 B2
(45) Date of Patent: *Sep. 8, 2015

(54) SYSTEMS AND METHODS FOR PROCESSING PRINT JOBS

(75) Inventors: Khaled S. Sedky, Sammamish, WA (US); Oliver H. Foehr, Mercer Island, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 2634 days.

This patent is subject to a terminal disclaimer.

(21) Appl. No.: 11/009,765

(22) Filed: Dec. 10, 2004

(65) Prior Publication Data

US 2006/0126105 A1    Jun. 15, 2006

(51) Int. Cl.
*G06F 15/00* (2006.01)
*G06F 3/12* (2006.01)

(52) U.S. Cl.
CPC .............. *G06F 3/1277* (2013.01); *G06F 3/126* (2013.01); *G06F 3/1208* (2013.01); *G06F 3/1285* (2013.01)

(58) Field of Classification Search
CPC ..... G06F 3/1208; G06F 3/126; G06F 3/1277; G06F 3/1285
USPC ......... 358/1.1, 1.15, 1.9, 1.13; 710/15, 31, 38
See application file for complete search history.

(56) References Cited

U.S. PATENT DOCUMENTS

| | | | | |
|---|---|---|---|---|
| 4,698,766 A * | 10/1987 | Entwistle et al. | ............... | 700/96 |
| 6,683,696 B1 * | 1/2004 | Urie et al. | ..................... | 358/1.15 |
| 7,136,941 B2 * | 11/2006 | Nguyen et al. | ................... | 710/15 |
| 2003/0011806 A1 * | 1/2003 | Shiohara | ...................... | 358/1.15 |
| 2004/0032611 A1 * | 2/2004 | Daly et al. | .................... | 358/1.13 |
| 2004/0044889 A1 | 3/2004 | Kamataki | | |
| 2004/0093491 A1 * | 5/2004 | Ebata | ............................ | 713/100 |
| 2004/0184061 A1 | 9/2004 | Christiansen | | |
| 2004/0227969 A1 | 11/2004 | Baba | | |
| 2005/0146742 A1 * | 7/2005 | Gregory | ....................... | 358/1.15 |
| 2006/0126089 A1 | 6/2006 | Sedky et al. | | |

OTHER PUBLICATIONS

Office action for U.S. Appl. No. 11/009,737, mailed on Mar. 27, 2013, Sedky et al., "System and Methods for Processing Print Jobs", 13 pages.
Final Office Action for U.S. Appl. No. 11/009,737, mailed on Oct. 10, 2013, Khaled S. Sedky, "System and Methods for Processing Print Jobs", 17 pages.
Office action for U.S. Appl. No. 11/009,737, mailed on Mar. 27, 2014, Sedky et al., "System and Methods for Processing Print Jobs", 15 pages.

* cited by examiner

*Primary Examiner* — Iriana Cruz
(74) *Attorney, Agent, or Firm* — John Jardine; Kate Drakos; Micky Minhas

(57) ABSTRACT

An implementation of a print job processing sub-system includes a first bundle configured for rendering print jobs for a first print device and a second bundle configured for rendering print jobs for a second print device. The sub-system also includes a regionally-aware component configured to direct print jobs to the first or second bundles.

16 Claims, 7 Drawing Sheets

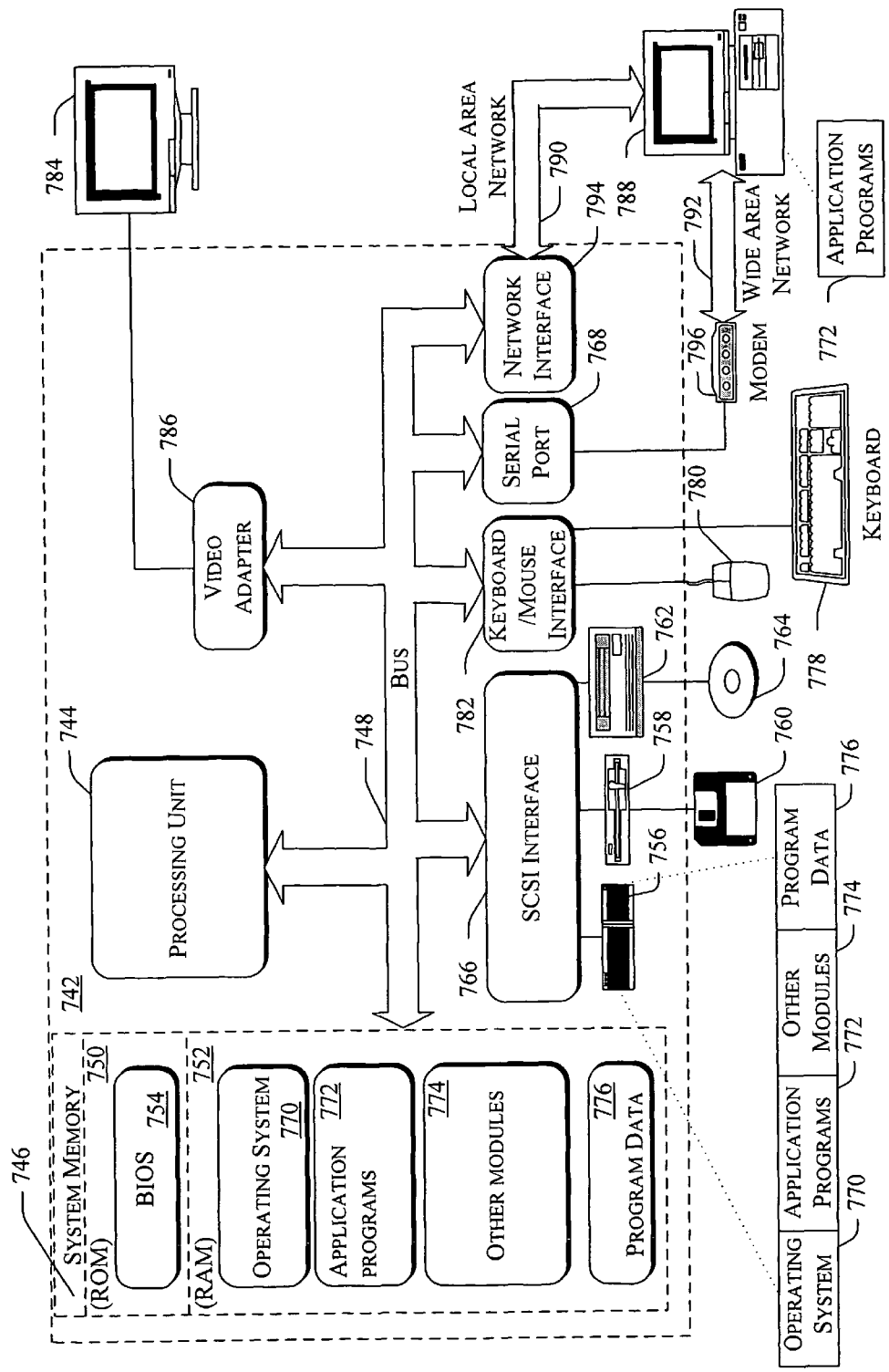

SYSTEMS AND METHODS FOR PROCESSING PRINT JOBS

RELATED APPLICATIONS

This application is related to application Ser. No. 11/009,737, entitled "System and Methods For Processing Print Jobs", naming, Khaled S. Sedky, Oliver H. Foehr, Syed Ali M. Naqvi and Harvinder P. Singh, as inventors, filed on Dec. 10, 2004.

TECHNICAL FIELD

The invention pertains to systems and methods for processing print jobs.

BACKGROUND

A user of a computing device may interact with various applications supported by the computing device. Such applications can include almost any conceivable functionality such as word processing, spreadsheet applications, and photo-editing applications, among others. The user may generate a print job from any of the applications. Whether the user computer is freestanding or networked the print job is directed to a print spooler.

The spooler contains one or more print drivers or filters which render the print job into a format recognizable by a print device. The spooler then sends the print job to the print device. If the filter processing the print job fails or freezes-up for any reason, the filter also often causes the other filters and the spooler to fail. Such instances can be especially acute where the spooler is receiving multiple print jobs which all fail because of the failure of a single filter. Dozens or hundreds of print jobs may be lost in some instances where a failed filter causes a system failure. For example, if the spooler happens to be in a networked print server the spooler could be processing hundreds of print jobs on multiple filters for multiple print devices. The failure of a single filter can cause the failure of all of the print jobs in the system. At least for these reasons, system configurations which have the filter or filters as a component of the spooler are not conducive to system reliability or flexibility.

SUMMARY

Systems and methods for processing print jobs are described herein.

In some implementations a system comprises a spooler configured to receive a print job and one or more bundles of filters for rendering the print job into a format recognizable by a print device. The system can further comprise a sub-system configured to act as a communication intermediary such that the spooler does not need to directly communicate with the one or more bundles. For instance, the sub-system may include a routing component configured to facilitate routing individual print jobs from the spooler to an appropriate individual bundle without the spooler needing to directly communicate with the bundle. In some instances, the sub-system may provide further functionalities, some of which are described below.

BRIEF DESCRIPTION OF THE DRAWINGS

FIG. 7 illustrates exemplary systems, devices, and components in an operating environment in which print job processing can be implemented.

DETAILED DESCRIPTION

Overview

Figure 1:
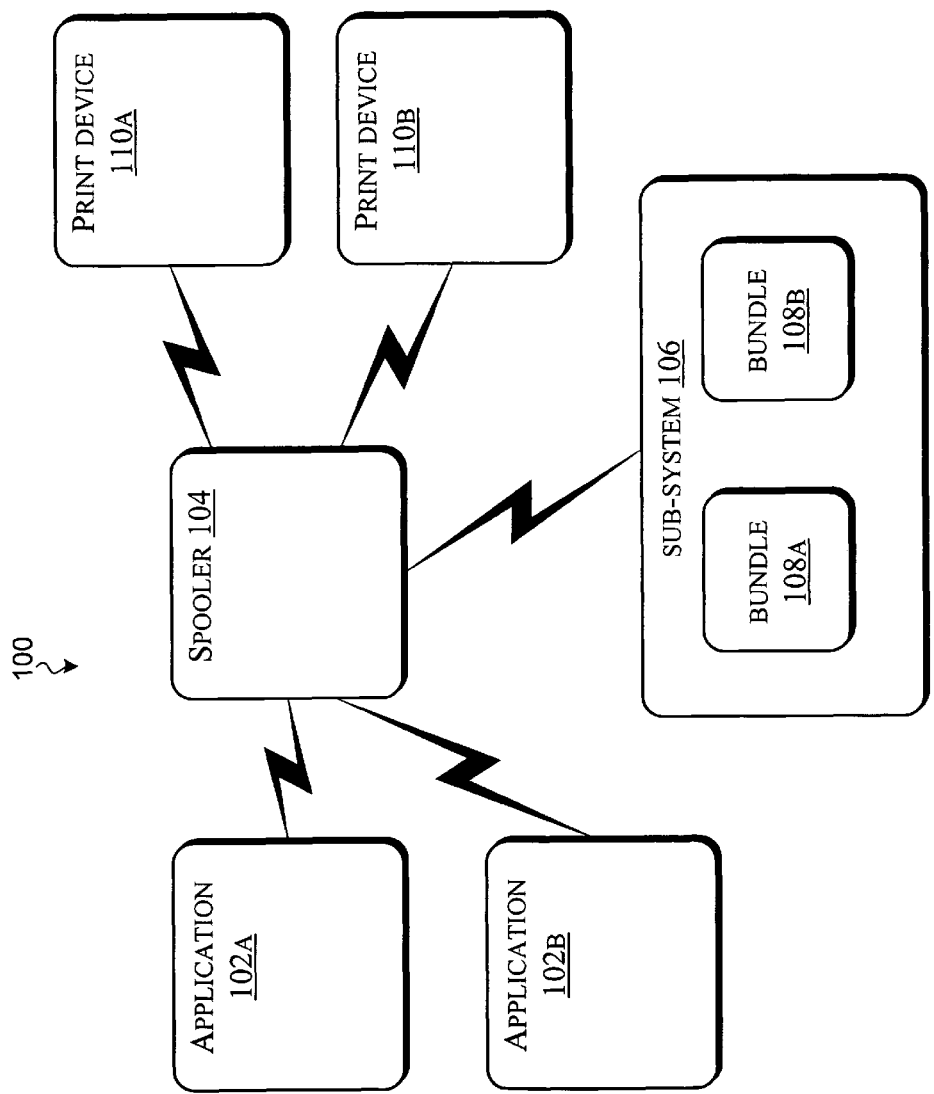
FIGS. 1-3 illustrate representations of systems in which exemplary embodiments for processing print jobs can be implemented.

The following description relates to methods and systems for processing print jobs. At least some implementations provide an interface between a spooler component(s) and one or more filter components. Some of these implementations serve to communicatively isolate the spooler from the filter(s). In one such implementation, a print spooler is configured to receive and queue print jobs from one or more applications. The filter is contained in, or associated with a sub-system such that the spooler communicates with the sub-system rather than needing to communicate directly with the filter. The filter prepares or processes a print job according to a set of guidelines or criteria for a given print device. Further, the sub-system can manage the filter during processing of the print job.

Configurations having a communication intermediary between the spooler and the filter can reduce the likelihood that a failure of any one of the filters can compromise the spooler. Further, in at least some implementations, the sub-system serves to isolate the filters from one another such that a failure of an individual filter need not compromise the remaining filters. Alternatively or additionally, separating the filter from the spooler can allow filters to be reconfigured and/or added or removed from the system with reduced impact on the functional state of the spooler.

In some implementations, the sub-system comprises a job router which communicates with the spooler and facilitates getting the print job directed to the appropriate filter(s). The sub-system, such as through the job router, can also allow increased flexibility and efficiency relative to the life time of the print job as will be described in more detail below. Various system implementations described below allow individual print queues to be factored out to independent process entities.

The embodiments described below are described in the context of a computing environment. Various embodiments can be implemented by computer-executable instructions or code means, such as program modules, that are executed by a computer, such as a personal computer or PC. Generally, program modules include routines, programs, objects, components, data structures and the like that perform particular tasks or implement particular abstract data types.

Various embodiments may be implemented in computer system configurations other than a PC. For example, various embodiments may be realized in hand-held devices, multi-processor systems, microprocessor-based or programmable consumer electronics, network PCs, minicomputers, mainframe computers and the like. Alternately or additionally, various embodiments may also be practiced in distributed computing environments, where tasks are performed by remote processing devices that are linked through a communications network. In a distributed computing environment, program modules may be located in both local and remote memory storage devices.

Although the various embodiments may be incorporated into many types of operating environments as suggested above, a description of but one exemplary environment appears in FIG. 7 in the context of an exemplary general-purpose computing device in the form of a conventional computing device which is described in more detail at the end of this document under the heading "Exemplary Operating Environment".

Exemplary Implementations

FIG. 1 illustrates an exemplary system 100. System 100 comprises one or more applications, with applications 102A, 102B illustrated here, a spooler 104, a sub-system 106, one or more bundles, with bundles 108A, 108B illustrated here, and one or more print devices, with print devices 110A, 110B illustrated here. System 100 represents a configuration which can be utilized in managed code environments as well as unmanaged code environments as should be recognized by the skilled artisans. More detailed configurations are described below.

In system 100, applications 102A, 102B comprise any component or components configured to generate a print job but which do not save the print job in a format recognizable by a print device. As such, further processing of the print job may be needed before delivery to the print device. Examples of applications include, among others, word processing applications, spreadsheet applications, and graphics applications. Applications 102A, 102B are communicatively coupled to spooler 104 which is configured to receive and store the print jobs either in a format utilized by the application or in an intermediate format as should be recognized by the skilled artisan. The spooler is communicatively coupled to sub-system 106 which is associated with bundles 108A, 108B.

Individual bundles comprise one or more filters which are collectively configured to render the print job into a format recognizable by a given print device. For example, bundle 108A can be configured to render print jobs into a format recognizable by print device 110A while bundle 108B can be configured to render print jobs into a format recognizable by print device 110B. In at least some configurations, bundles can be added to, or reconfigured within the sub-system while allowing the spooler to remain functional. For example, while a first print job is processed on bundle 108A for spooler 104, bundle 108B may be reconfigured to satisfy a new rendering functionality. Bundle configuration is discussed in more detail below.

Figure 2:
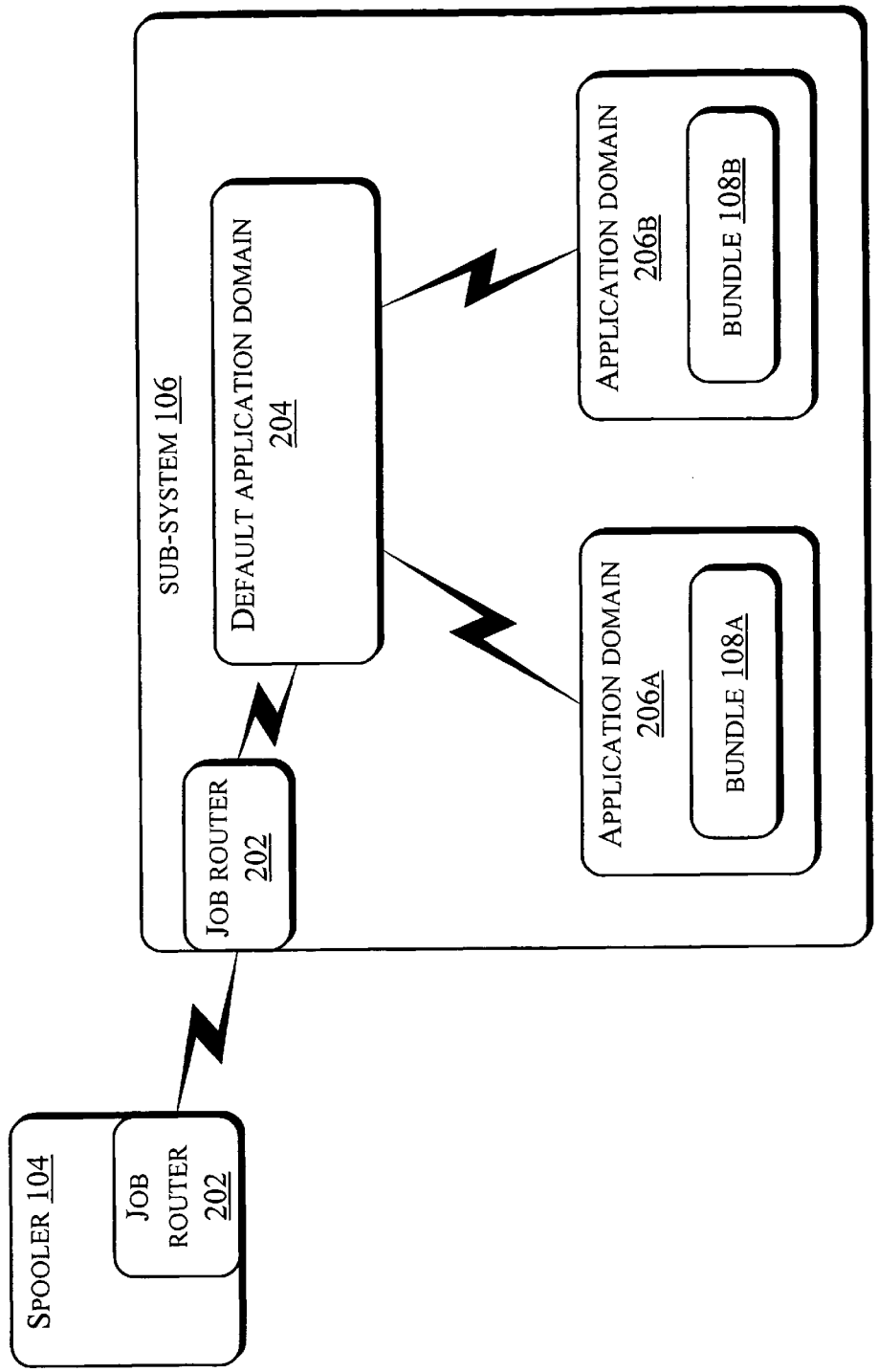

As an example of an exemplary sub-system configuration, consider the following in connection with FIG. 2 which illustrates a more detailed representation of one possible configuration of sub-system 106 and its relationship with spooler 104.

FIG. 2 illustrates spooler 104, sub-system 106 and bundles 108A, 108B as described in relation to FIG. 1. In this particular implementation, sub-system 106 can be thought of as a print job processing sub-system, comprising a job router 202, a default application domain 204, and two application domains 206A, 206B. Application domain 206A is configured to host bundle 108A while application domain 206B is configured to host bundle 108B. Job router 202 serves as a routing component which can manage print jobs generated by applications 102A, 102B. Such managing can include, among other functions job routing and/or job scheduling. Alternatively, the sub-system may comprise a job scheduler component which can be a sub-component of the job router or which can be a separate component.

Intermediary Between Spooler and Filter

The sub-system can provide an intermediary functionality such that the spooler does not need to directly communicate with the filter(s). In some implementations, the intermediary functionality effectively communicatively isolates the spooler from the filter.

FIG. 2 provides an example of how the sub-system can act as a communication intermediary such that the spooler does not need to directly communicate with the filter. In this implementation, spooler 104 communicates with sub-system 106. Correspondingly, sub-system 106 communicates with bundles 108A, 108B. In this configuration the filter functionality, embodied as bundles 108A, 108B, is separate and distinct, and effectively isolated from spooler 104. This isolation can reduce the incidence of a failed filter causing the spooler to malfunction.

Component Isolation

In at least some configurations, the sub-system can serve to isolate individual components such as individual bundles from one another. Such isolation can reduce the incidence of a failed bundle bringing-down other bundles and thereby allow the other bundles to remain functional. Such a configuration can allow the system to continue to process at least some print jobs while an individual bundle is malfunctioning.

As an example of how such isolation can be accomplished consider the following in connection with FIG. 2. Sub-system 106 manages individual bundles 108A, 108B in individual application domains 206A, 206B respectively. In this particular implementation, each application domain contains only a single bundle. In other implementations, multiple bundles may reside within a single application domain. Individual application domains, or an equivalent functionality, can prevent other application domains from directly accessing code or resources contained therein. At least for this reason, a fault in an application domain need not affect other components within the sub-system such as the other application domains. In instances where multiple bundles exist within an application domain the bundles may also be isolated from one another such that a failure of one bundle need not cause a failure of the other bundles within the application domain.

Alternatively or additionally, a fault within an individual application domain, such as a fault of a filter, need not affect other components outside of the sub-system, such as the spooler. As such, the sub-system can in some implementations serve to separate filter stability from spooler stability.

Separate Print Job Data into Sub-Units Which can be Individually Processed

In at least some implementations the sub-system can divide a print job into individual sub-units which can be individually scheduled and rendered. FIG. 2 provides but one example of such a configuration. The sub-system can divide individual print jobs into sub-units with each sub-unit having a designation which identifies it as a sub-portion of the original print job.

The sub-units can be independently processed by the appropriate bundle. Such a configuration can facilitate the rendering process. For example, assume job router 202 receives first and second print jobs for bundle 108A. Assume that in this example, the first print job is divided into 5 sub-units and the second print job is divided into 3 sub-units.

In but one scenario, bundle 108A receives the first three sub-units of the first print job but not the last two units. Processing power can be allocated to rendering the three available sub-units. Meanwhile, bundle 108A receives the three sub-units of the second print job. Upon rendering the first three sub-units of the first job, processing power can be reallocated to render the three sub-units of the second print job. While this processing of the second print job is occurring, the final two sub-units of the first print job may become available to the bundle and the processing power can be allocated back to processing the remainder of the first print job upon completion of rendering the second print job. This configuration can allow for improved allocation of processing power as compared to requiring the second print job to remain unprocessed until the first print job is completed.

Assess a Condition of Individual Bundles

The sub-system, such as sub-system 106 illustrated in FIG. 2, can assess a status or condition of individual bundles. For example, the condition may be functioning ("up") or malfunctioning ("down"). The status information can be utilized in managing the various print jobs. For example, print jobs directed to a bundle which is down may be held in the queue or cancelled while other print jobs intended for functioning bundles are sent to their respective bundles. The system can be configured to pass the status of individual bundles to other components within and/or external to the sub-system to aid print job processing. For example, the statuses of the bundles may be passed to the spooler so that the spooler can cancel or delay the appropriate print jobs and continue with the print jobs directed to functional bundles.

Map Print Jobs to Appropriate Bundles

Figure 3:
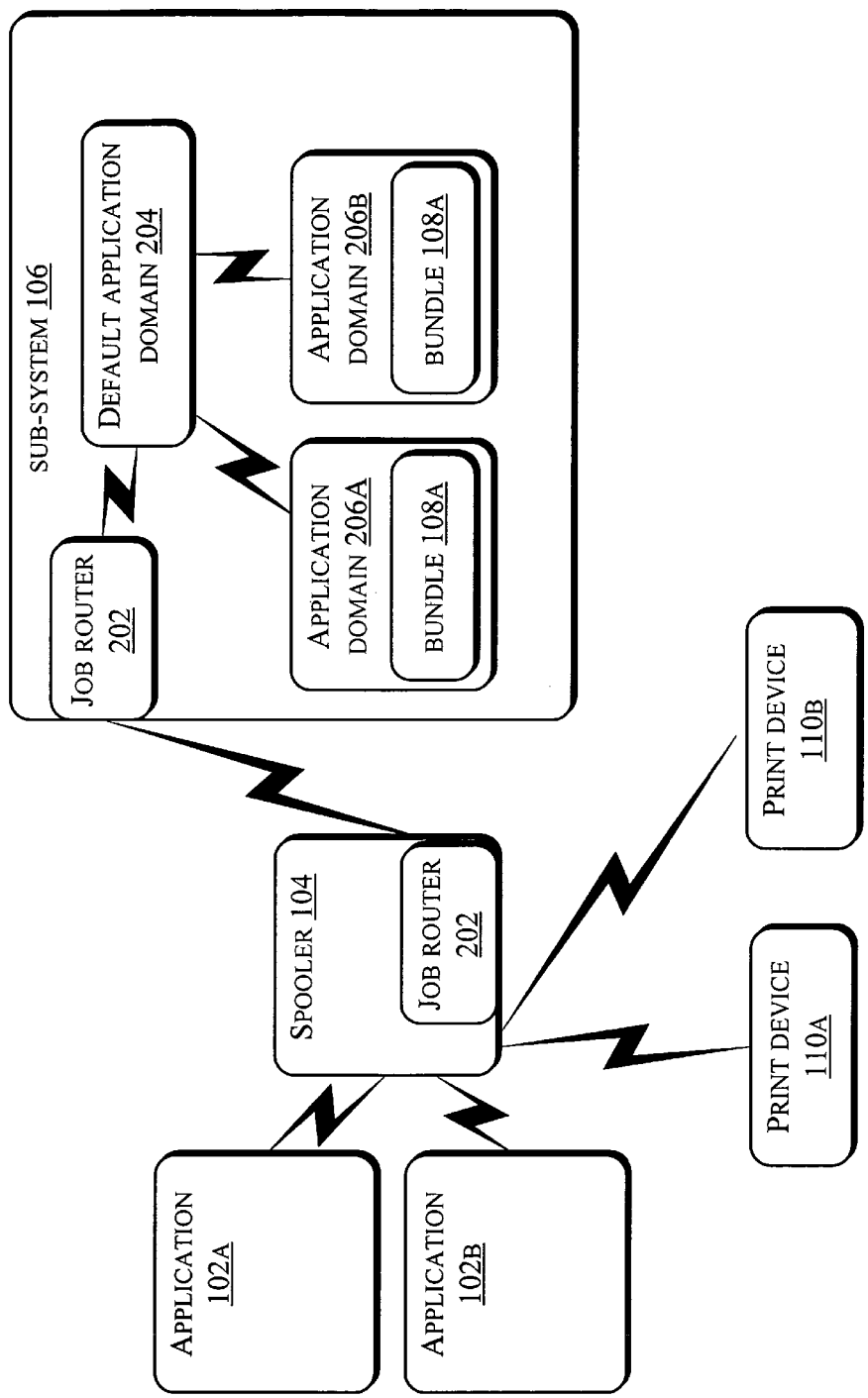

The sub-system can utilize reference identifiers to direct individual print jobs from the spooler to an appropriate bundle for processing. Consider table 1 in conjunction with FIG. 3 as one example of how exemplary sub-system 106 routes jobs to the appropriate bundle. In this example the sub-system's job router 202 utilizes table 1 to route print jobs to the appropriate bundle. In this instance, assume that application 102A comprises a word processing application and that application 102B comprises a spreadsheet application.

TABLE 1

| Application | Job ID | Bundle ID | Print Device |
|---|---|---|---|
| 102A | Job 1 | 108A | 110A |
| 102A | Job 2 | 108B | 110B |
| 102B | Job 3 | 108A | 110A |
| 102B | Job 4 | 108B | 110B |

As evidenced from Table 1, application 102A generates a first print job (Job 1) for print device 110A and a second print job (Job 2) for print device 110B. Meanwhile, application 102B generates a first print job (Job 3) for print device 110A and a second print job (Job 4) for print device 110B. Job router 202 utilizes the reference identifier in the form of the job ID and the bundle ID to direct the jobs to the appropriate bundles and to manage the print jobs for the lifetime of the individual job. The job ID is an identifier which is unique to the data of a particular print job. The bundle ID indicates the bundle for which the print job is intended. Bundle IDs will be described in more detail below.

In the situation where job router 202 has previously seen the bundle ID—for example where the bundle already exists, then the job router sends the print job either directly or indirectly to the bundle indicated in the bundle ID. In one such configuration, the job router sends the print job to a regional managing component which then interacts with the bundle via the local managing components. Examples of this process will be described in more detail below in relation to FIG. 4.

If job router 202 has not previously seen the bundle ID, such as in an instance where an appropriate or corresponding bundle does not yet exist, then the job router may cause the bundle to be created. For instance, job router 202 may cause the default application domain 204 to be instantiated which in turn may instantiate the application domains 206A, 206B and associated bundles 108A, 108B. The application domains can be instantiated utilizing various techniques. For example, in some implementations the operating system APIs can be utilized to instantiate the application domains. In another example, the job router directly instantiates the appropriate bundle. Such processes will be described in more detail below in relation to FIG. 4. Once the appropriate bundle is created the job router directs the print job to the bundle.

In some implementations, job router 202 receives a particular print job and associated bundle information from the spooler 104. The job router communicates with the default application domain 204 which maintains a table of all active application domains. Assume for purposes of explanation that, in this instance, application domains 206A, 206B comprise the active application domains. If an active application domain has a filter pipeline loaded that complies with the bundle information (i.e. the application domain has the same filter pipeline required by the job bundle information) then the default application domain sends the print job to that application domain. If no appropriate active application domain exists, the default application domain can create, or cause to be created, a new application domain and then send the print job to the newly created application domain. Such a configuration can allow individual print jobs from a print queue to be factored out to independent process entities, which in this instance comprise individual bundles.

Bundle Configurations and Management

An individual bundle is configured to achieve a desired rendering functionality. The bundle can comprise one or more filters each of which performs at least a portion of the rendering functionality. For example, assume that a print job is intended for a particular print device. Also, assume that the rendering functionality has three portions; first adding a watermark to the pages of the print job, second performing what is known as 'N-UP' which tabulates multiple records across a page. So for example, a single printed page would comprise 4 pages of the print job such that a 16 page document is printed on 4 pages. The third portion of the rendering functionality comprises formatting the print job to a standard page description language (PDL) format, which a particular print device can process. In this example, these three rendering functionalities collectively render the print job into a format recognize by the particular print device.

For purposes of example, assume that the bundle for this rendering functionality comprises three filters. A first filter may perform a portion of the rendering relating to the watermark. A second filter may perform a portion of the rendering relating to the N-UP functionality. A third filter may perform a portion of the rendering functionality relating to formatting the print job to a standard PDL format.

The sub-system can provide a means for managing the filters so that each of the filters can, in turn perform its respective portion of the rendering functionality to collectively render the print job. The managing means can be achieved, in at least some implementations, by associating individual filters with individual locally-aware components.

An individual locally-aware component can manage an environment of the individual filter. For example, the locally-aware component can interface communications with the filter. In another example, the locally aware component can effectively communicatively isolate the filter from other filters. In still another example, the locally-aware component can manage the environment such that the filter can simply exist as a process unit which simply receives print jobs from the locally-aware component, process the print jobs for receipt by the locally-aware component. In such a scenario, the filter is effectively isolated from other components and does not need to be aware of other components or how to communicate with them. The locally-aware component can provide a print job in a data type utilized by the filter and if necessary further manipulate the filter's output before directing the output to another component. In some configurations, an individual locally-aware component and the filter it manages can be thought of as a filter pair comprising a processing unit or component and a managing component.

In such an application, the locally-aware components can be managed by a regionally-aware component which directs print jobs to the locally-aware components. The regionally-aware component may coordinate communications between the various locally aware components. Among other functions, the regionally aware component may manage the life a print job. The regionally-aware component may also communicate the status of the print job to other components of the sub-system. For example, the regionally-aware component may indicate to other components, such as the job router, when rendering of a print job is completed. All of the filter pairs of a bundle may or may not reside on the same physical device. In the event that the individual filters are distributed across networked devices the regionally-aware component can act to manage the routing the print job to the various devices and coordinate the processing thereof.

Figure 4:
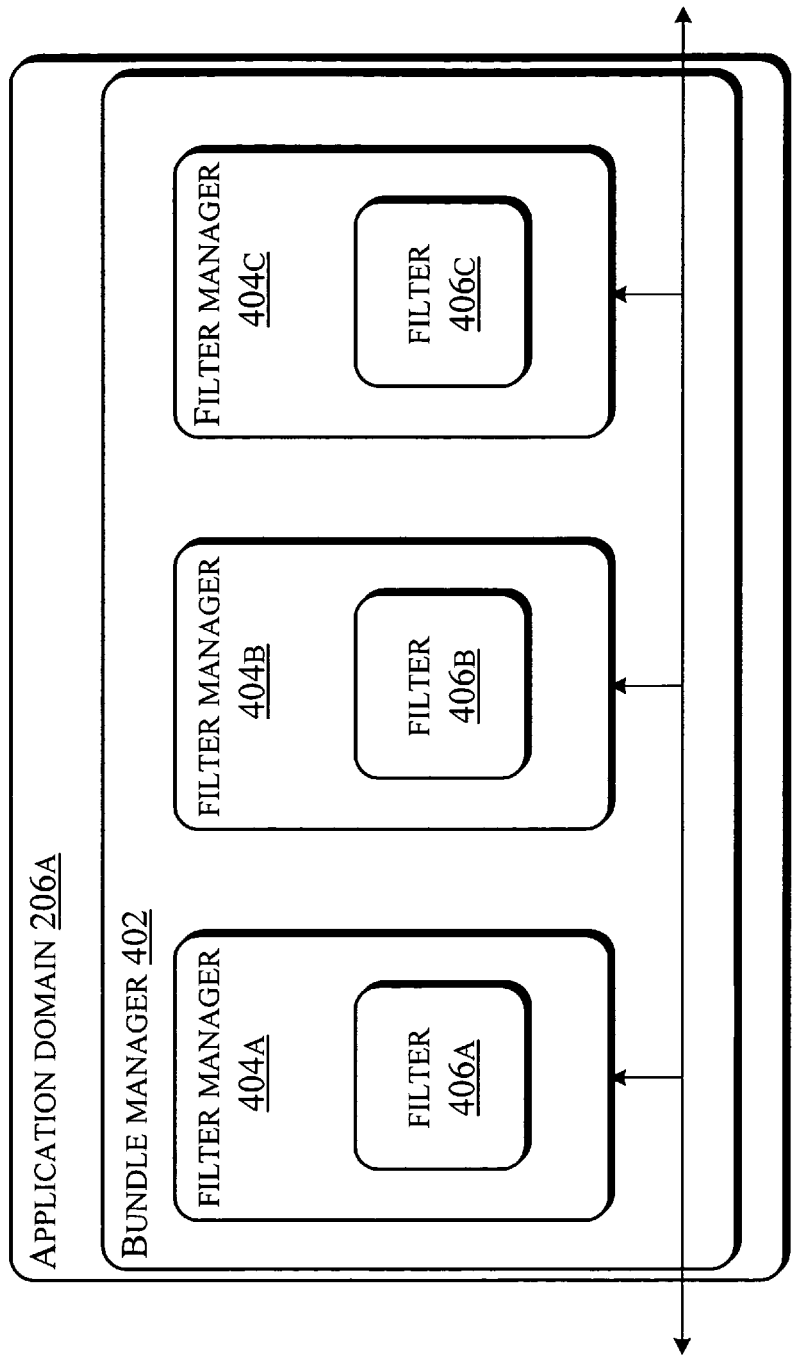
FIG. 4 illustrates a representation of a component of a system in which exemplary print job processing embodiments can be implemented.

Consider FIG. 4 as an example of how one or more filters can be associated to collectively perform the rendering functionality described above. FIG. 4 illustrates application domain 206A, a regionally-aware component comprising a bundle manager 402, three locally-aware components comprising filter managers 404A-404C and three filters 406A-406C comprising the bundle which is not specifically designated. This is but one example, and the number of bundle managers, filter managers and/or filters may vary among various implementations.

Application domain 206A hosts, or is associated with, bundle manager 402, and the filter managers 404A-404C. Bundle manager 402 serves as a regionally-aware component which manages routing within the application domain 206A. For example, in a configuration having multiple bundles within an application domain the bundle manager decides to which bundle to send a print job.

In this implementation, individual filter managers 404A-404C are examples of locally-aware components that can handle communications into and out of their respective filters 406A-406C. Further, in this particular implementation, individual filter manager's host the respective filter in a data container as should be recognized by the skilled artisan. Filter managers 404A-404C are aware of the existence of multiple filters. The filter managers are aware of how to communicate with the multiple filters, and know how to route data between the multiple filters. In contrast, the filter need not know more than that it is process unit which receives data in the form of a print job, processes the print job, and outputs the print job. As is discussed in relation to separating print jobs into individual units for processing, the filter may not actually be receiving the entire print job, but instead may receive a unit of the print job packaged to appear as the entire print job. In some implementations, the filter manager may package the individual units of the print job such that the filter perceives individual units to be complete print jobs. Upon completion of processing of all the individual units, the filter managers and/or the bundle managers can reassemble the units in the original configuration.

Assume consistent with the example above that filter 406A performs a portion of the rendering relating to the watermark, filter 406B performs a portion of the rendering relating to the N-UP functionality, and that filter 406C performs a portion of the rendering relating to format to PDL. The sub-system configuration of FIG. 4 allows the filters to be selected based upon their functionality without regards to inter-compatibility issues. For instance, since the filters need not directly communicate, filters can be selected without regard to the data type utilized by the individual filters. For example, assume that bundle manager 402 sends print job 1 to filter manager 404A. If needed, the filter manager can manipulate the data type of the print job before sending it to filter 406A to perform the first portion of the rendering functionality which in this instance involves the watermark. Filter manager 404A can further manipulate the print job before sending it to filter manager 404B which can correspondingly manipulate the data into and out of filter 406B, similarly filter manager 404C can manipulate the data relative to filter 406C. As described above the filter managers are aware of the various filters and can manipulate data into and out of their respective filters such that different data types can be accommodated. This configuration can allow the filters to be made by different companies and for different systems since each one is managed by a filter manager and as such individual filters do not need to be configured to communicate with other filters.

Bundle Formation

Print jobs can contain, or be associated with, information useful for managing print job processing. Examples of such information can include, but are not limited to, the particular print device for which the print job is directed and the specific rendering functionality to be performed upon the print job.

In some implementations, if the sub-system does not contain a bundle corresponding to the rendering functionality then the sub-system can attempt to create the bundle. The sub-system can identify filters which perform different portions of this rendering functionality. The sub-system can search for the filters on a device upon which the sub-system resides and/or from a distributed environment such as network. For example, the sub-system may search over the web to locate a filter which performs a specific portion of the rendering functionality. Once located, the various filters can then be associated as a bundle to collectively perform the rendering functionality. In some examples, the sub-system may already contain a bundle which performs most of the rendering functionality such the sub-system need only find one or a few additional filters. The sub-system can then create the new bundle from the existing bundle and the new filter(s). In other examples, the sub-system may have to create an entirely new bundle from multiple filters. As described above, the sub-system's management configuration may reduce interoperability issues between different filters. Such a configuration may increase the number of potential filters available to perform a portion of the rendering functionality since interoperability issues between different filters may be reduced and/or obviated by the filter management functionality.

In some implementations, individual bundles can be given a bundle ID which relates to information about the bundle. In but one example, a bundle ID for a particular bundle may indicate a particular print device for which the bundle is configured, the number of filters comprising the bundle, and/or the functionality achieved by the individual filters. Further, the bundle ID may indicate the data type that an individual filter can process and the data type output by the filter. The bundle ID may also describe properties of individual filter managers which manage the individual filters. The system can compare individual print jobs and their associated information with the bundle information to direct print jobs to appropriate bundles and/or or to assemble new bundles.

Exemplary Methods

Figure 5:
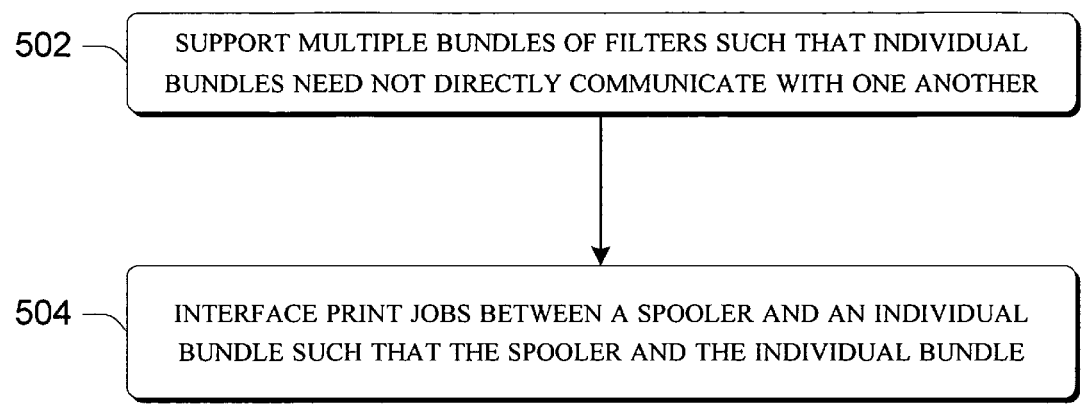
FIGS. 5-6 are flow diagrams that illustrate exemplary print job processing embodiments.

FIG. 5 represents a flow diagram of acts in accordance with an implementation for processing print jobs. The methods can be implemented in any suitable hardware, software, firmware or combination thereof. In but one embodiment the method can be implemented using a system such as the one described above.

Act 502 supports multiple bundles of filters such that individual bundles need not directly communicate with one another. In some implementations, individual bundles are communicatively isolated from one another. Among other advantages, such a configuration can reduce the likelihood that a failure of one bundle will cause a failure of other bundles. In at least some managed code implementations the bundles are hosted within one or more application domains. But one such example of a system configuration where multiple bundles need not directly communicate with one another is described above in relation to FIG. 2. In but one implementation, communication within an application domain can be managed by a regionally-aware component such as a bundle manager which directs print jobs to individual bundles and which interfaces inter-bundle communications. One such example is described above in relation to FIG. 4.

Act 504 interfaces print jobs between a spooler and an individual bundle such that the spooler and the individual bundle need not directly communicate with one another. In some implementations such interfacing contributes to communicatively isolating the spooler from the bundles such that a failure of one of the bundles need not cause the spooler to malfunction. One such example is described above in relation to FIG. 2 where the subsystem interfaces between the spooler and the bundles. In that particular example, the job router satisfies the interface role such that the spooler and the individual bundles need not communicate with one another in the processing of a print job.

Figure 6:
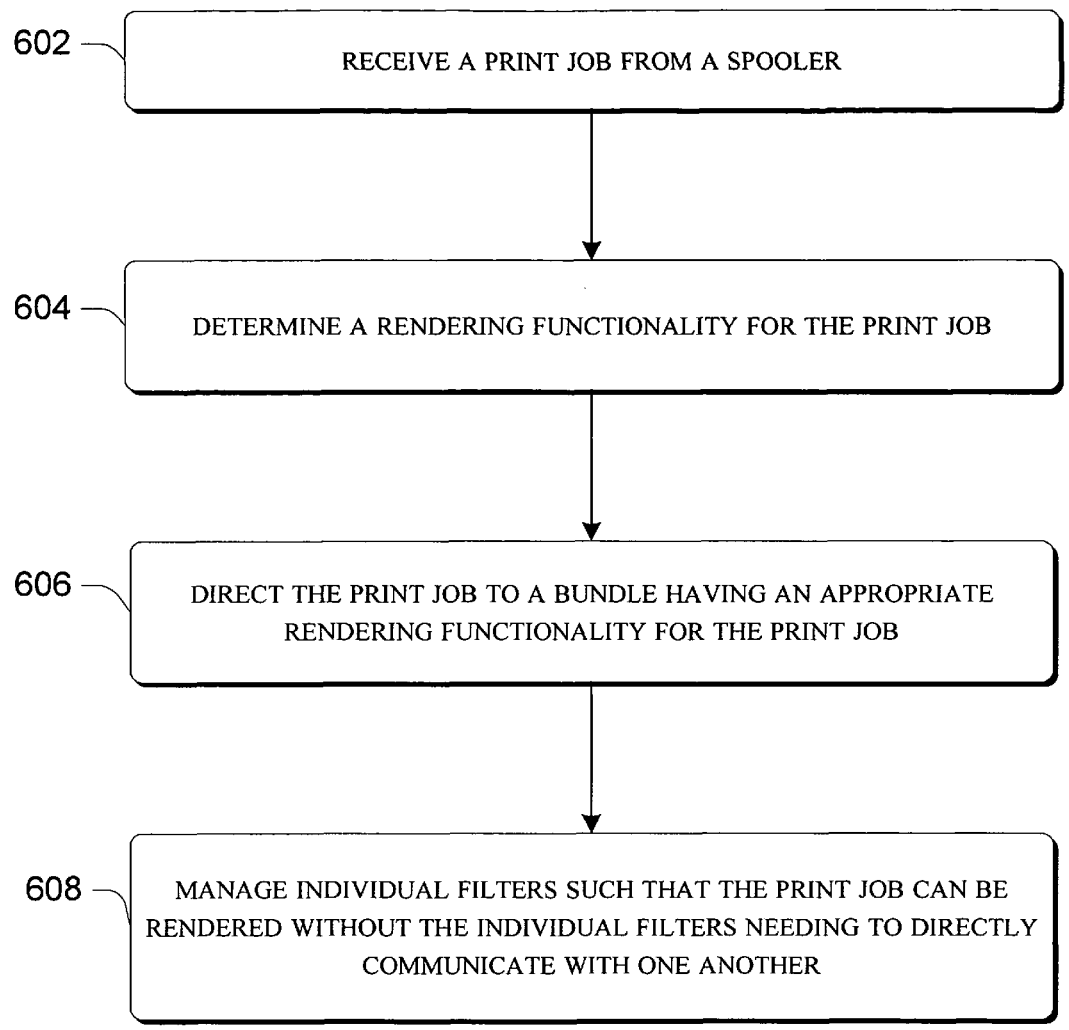

FIG. 6 represents a flow diagram of acts in accordance with implementation for processing print jobs. The methods can be implemented in any suitable hardware, software, firmware or combination thereof. In but one embodiment the method can be implemented using a system such as the one described above.

Act 602 receives a print job from a spooler. One such example is provided above in relation to FIG. 1 where a sub-system communicates with the spooler to receive print jobs. In some implementations, the sub-system comprises a job router which communicates with the spooler. One example of such a configuration is described above in relation to FIG. 2.

Act 604 determines a rendering functionality for the print job. Information contained in or associated with the print job can be utilized in the determination. For example, the print job can be directed to a particular print device and can require a particular rendering functionality based upon the requirement of the print device and the print job itself. One such example is described above in relation to FIG. 3.

Act 606 directs the print job to a bundle having an appropriate rendering functionality for the print job. In some implementations, the method evaluates multiple bundles and identifies a set of filters capable of collectively rendering the print job for a given print device and then directs the print job to the identified bundle. Several such examples are described above in relation to FIGS. 2-4.

Act 608 manages individual filters such that the print job can be rendered without the individual filters needing to directly communicate with one another. In some implementations such management is achieved by associating individual locally-aware components with individual filters such that the filters need not communicate with one another to process the print job. In some instances such managing results in the individual filters not needing to be aware of one another to process the print job. In some instances the locally-aware components comprise filter managers which themselves are managed by a regionally-aware components such as a bundle manager. In at least some exemplary implementations, the method can instantiate the bundle manager and filter managers to host a particular bundle.

Exemplary Operating Environment

FIG. 7 shows an exemplary computing device that can be used to implement the processes described above. Computing device 742 comprises one or more processors or processing units 744, a system memory 746, and a bus 748 that couples various system components including the system memory 746 to processors 744. The bus 748 represents one or more of any of several types of bus structures, including a memory bus or memory controller, a peripheral bus, an accelerated graphics port, and a processor or local bus using any of a variety of bus architectures. The system memory 746 comprises read only memory (ROM) 750 and random access memory (RAM) 752. A basic input/output system (BIOS) 754, containing the basic routines that help to transfer information between elements within computing device 742, such as during start-up, is stored in ROM 750.

Computing device 742 can further comprise a hard disk drive 756 for reading from and writing to a hard disk (not shown), a magnetic disk drive 758 for reading from and writing to a removable magnetic disk 760, and an optical disk drive 762 for reading from or writing to a removable optical disk 764 such as a CD ROM or other optical media. The hard disk drive 756, magnetic disk drive 758, and optical disk drive 762 are connected to the bus 748 by an SCSI interface 766 or some other appropriate interface. The drives and their associated computer-readable media provide nonvolatile storage of computer-readable instructions, data structures, program modules and other data for computer 742. Although the exemplary environment described herein employs a hard disk, a removable magnetic disk 760 and a removable optical disk 764, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 756, magnetic disk 760, optical disk 764, ROM 750, or RAM 752, including an operating system 770, one or more application programs 772 (such as a user agent or browser), other program modules 774, and program data 776. A user may enter commands and information into computer 742 through input devices such as a keyboard 778 and a pointing device 780. Other input devices (not shown) may comprise a microphone, joystick, game pad, satellite dish, scanner, or the like. These and other input devices are connected to the processing unit 744 through an interface 782 that is coupled to the bus 748. A monitor 784 or other type of display device is also connected to the bus 748 via an interface, such as a video adapter 786. In addition to the monitor, personal computers typically comprise other peripheral output devices (not shown) such as speakers and printers.

Computer 742 commonly operates in a networked environment using logical connections to one or more remote computers, such as a remote computer 788. The remote computer 788 may be another personal computer, a server, a router, a network PC, a peer device or other common network node, and typically comprises many or all of the elements described above relative to computer 742. The logical connections depicted in FIG. 7 comprise a local area network (LAN) 590 and a wide area network (WAN) 792. Such networking environments are commonplace in offices, enterprise-wide computer networks, intranets, and the Internet.

When used in a LAN networking environment, computer 742 is connected to the local network through a network interface or adapter 794. When used in a WAN networking environment, computer 742 typically comprises a modem 796 or other means for establishing communications over the wide area network 792, such as the Internet. The modem 796, which may be internal or external, is connected to the bus 748 via a serial port interface 768. In a networked environment, program modules depicted relative to the personal computer 742, or portions thereof, may be stored in the remote memory storage device. It will be appreciated that the network connections shown are exemplary and other means of establishing a communications link between the computers may be used.

Generally, the data processors of computer 742 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein comprises these and other various types of computer-readable storage media when such media contain instructions or programs for implementing the blocks described, in conjunction with a microprocessor or other data processor. The system described can also comprise the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Although embodiments relating to processing print jobs have been described in language specific to structural features and/or methods, it is to be understood that the subject of the appended claims is not necessarily limited to the specific features or methods described. Rather, the specific features and methods are disclosed as exemplary implementations for processing print jobs.

The invention claimed is:

1. A method comprising:
   determining a rendering functionality for a print job;
   identifying a first bundle of filter pairs configured to achieve the rendering functionality; and
   in the event that an appropriate filter pipeline that complies with the first bundle is not available, identifying multiple filter pairs that, when associated, collectively perform the rendering functionality, wherein:
      the multiple filter pairs include a first filter pair having a first processing component and a first filter locally-aware managing component and a second filter pair having a second processing component and a second filter locally-aware managing component,
      the first processing component and the first filter locally-aware managing component are communicatively isolated from the second processing component and the second filter locally-aware managing component, and
      identifying the multiple filter pairs comprises identifying a second different bundle that is configured to perform at least a portion of the rendering functionality and one or more filter pairs configured to perform a second different portion of the rendering functionality, and further comprising associating the second different bundle and the one or more filter pairs as the bundle configured to collectively render the print job.

2. A method as recited in claim 1, wherein the determining comprises, at least in part, accessing information associated with the print job.

3. A method as recited in claim 1, wherein the identifying multiple filter pairs comprises searching for filter pairs over a network environment.

4. One or more computer readable memory devices comprising computer executable instructions that, when executed, direct a computing device to perform the method of claim 1.

5. A method comprising:
   receiving a print job to be rendered for a print device;
   determining rendering functionality of a bundle of filters of filter pairs that include a processing component and a locally-aware managing component, configured to collectively render, at least in part, at least a portion of the print job into a format recognizable by the print device, wherein the bundle of filters of filter pairs is associated with multiple bundles;
   selecting the bundle of filters of filter pairs to render the print job for the print device;
   directing the print job to the bundle of filters of filter pairs, wherein the directing comprises dividing the print job into multiple units which are rendered individually such that the multiple units appear individually as complete print jobs to the bundle of filters; and directing individual units to the bundle of filters;
   directing less than all of the multiple units of the print job to the bundle of filters and then directing at least a portion of a second different print job to the bundle of filters before directing a remainder of the first print job to the bundle of filters; and
   managing individual filters such that the print job is rendered without the individual filters directly communicating with one another, wherein the individual filters are communicatively isolated from other filters of the bundle of filters.

6. A method as recited in claim 5, wherein the receiving comprises receiving the print job from a spooler.

7. A method as recited in claim 5, wherein the determining comprises identifying individual filters comprising the bundle of filters.

8. A method as recited in claim 7, wherein the identifying comprises accessing a bundle ID.

9. A method as recited in claim 5, wherein the managing comprises hosting the individual filters in individual data containers.

10. One or more computer readable memory devices comprising computer executable instructions that, when executed, direct a computing device to perform the method of claim 5.

11. A method comprising:
    receiving a print job to be rendered for a print device;
    determining rendering functionality of a bundle of filters of filter pairs that include a processing component and a locally-aware managing component, configured to collectively render, at least in part, at least a portion of the print job into a format recognizable by the print device, wherein the bundle of filters of filter pairs is associated with multiple bundles;

selecting the bundle of filters of filter pairs to render the print job for the print device;

directing the print job to the bundle of filters of filter pairs; and managing individual filters such that the print job is rendered without the individual filters directly communicating with one another, wherein the individual filters are communicatively isolated from other filters of the bundle of filters, and less than an entirety of the print job is processed by the individual filters and at least a portion of a second different print job is processed by the individual filters before causing a remainder of the first print job to be processed.

12. A method as recited in claim 11, wherein the receiving comprises receiving the print job from a spooler.

13. A method as recited in claim 11, wherein the determining comprises identifying individual filters comprising the bundle of filters.

14. A method as recited in claim 13, wherein the identifying comprises accessing a bundle identifier.

15. A method as recited in claim 11, wherein the managing comprises hosting the individual filters in individual data containers.

16. One or more computer readable memory devices comprising computer executable instructions that, when executed, direct a computing device to perform the method of claim 11.

* * * * *